Aug. 21, 1928.
C. S. HALL
1,681,637
AIRCRAFT LANDING AND HOUSING DEVICE
Filed Jan. 11, 1926   2 Sheets-Sheet 1
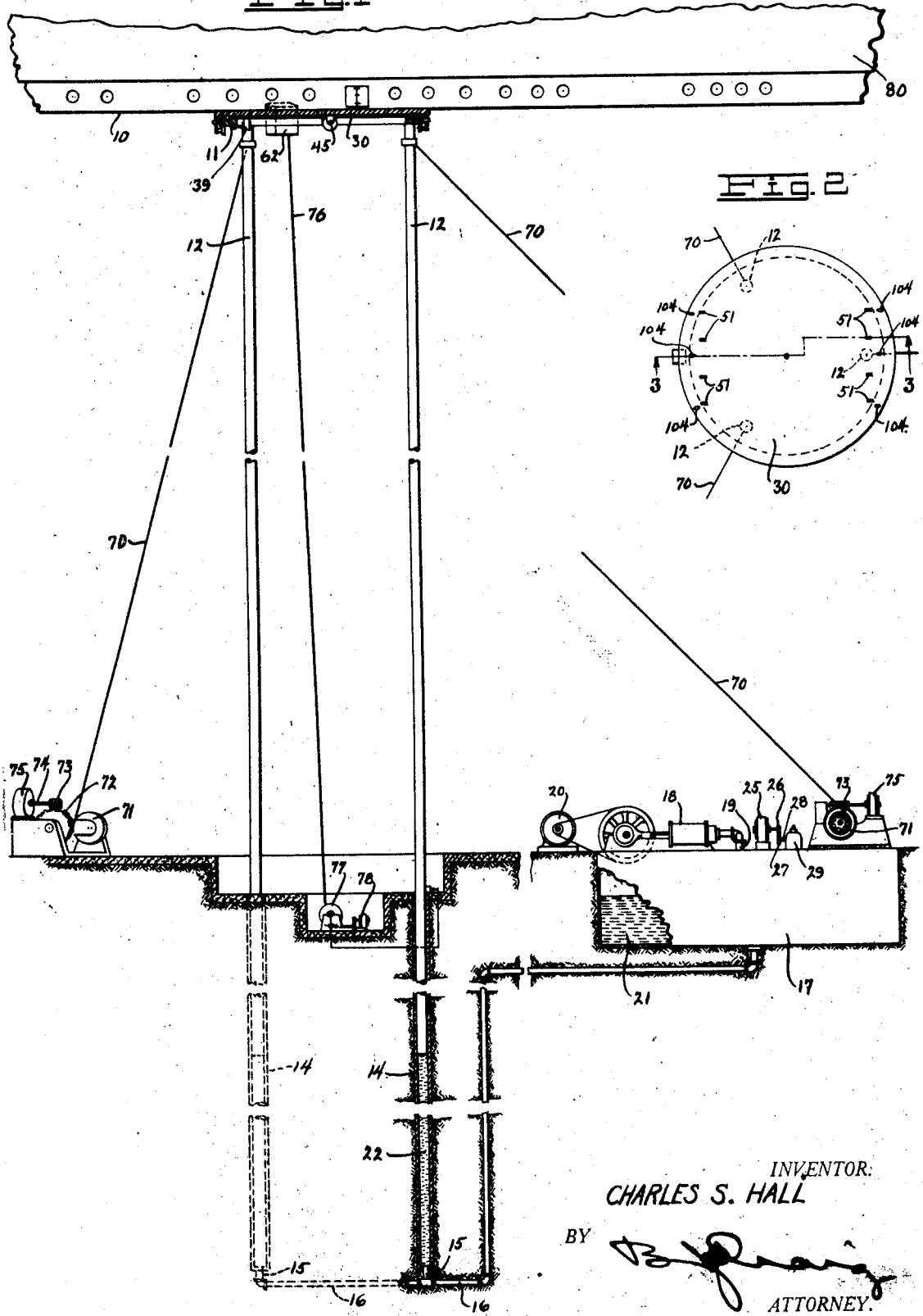
INVENTOR:
CHARLES S. HALL
BY
ATTORNEY.

Aug. 21, 1928.
C. S. HALL
1,681,637
AIRCRAFT LANDING AND HOUSING DEVICE
Filed Jan. 11, 1926    2 Sheets-Sheet 2
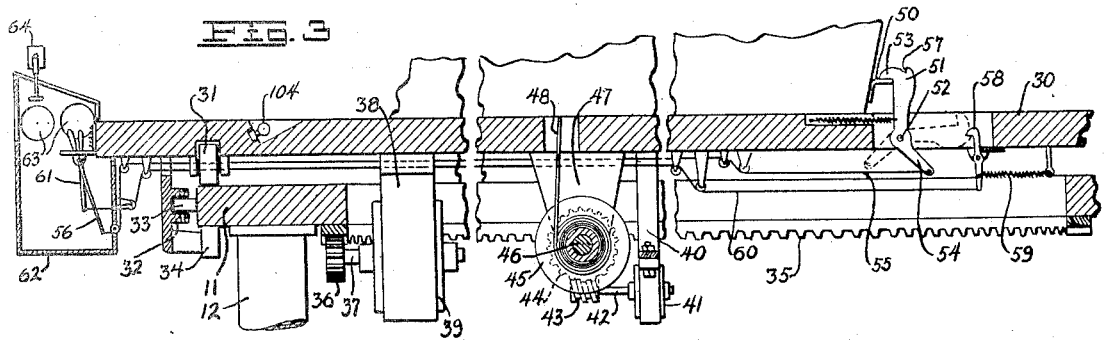
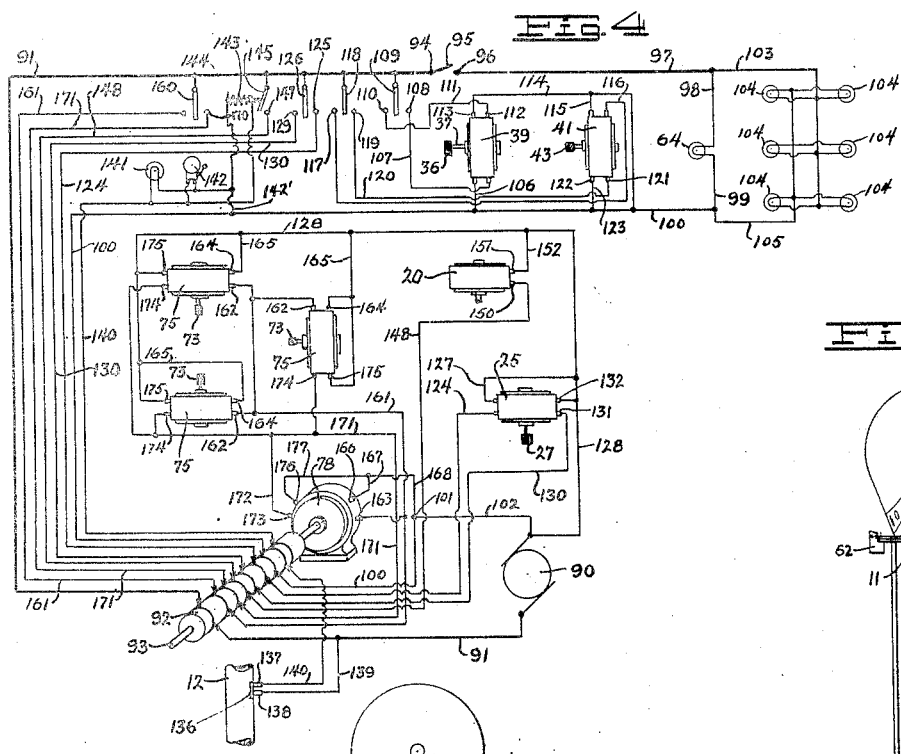
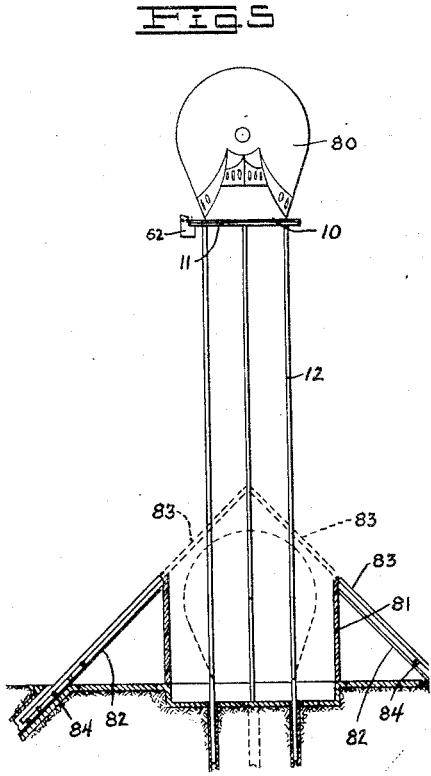
INVENTOR.
CHARLES S. HALL
BY
ATTORNEY Patented Aug. 21, 1928.

1,681,637

UNITED STATES PATENT OFFICE.

CHARLES S. HALL, OF OAKLAND, CALIFORNIA.

AIRCRAFT LANDING AND HOUSING DEVICE.

Application filed January 11, 1926. Serial No. 80,466.

This invention relates to aircraft landing and housing devices.

The general object of the invention is to provide an improved landing and housing device for aircraft, particularly dirigibles.

A specific object of the invention is to provide an aircraft landing means which is mounted for bodily vertical movement.

A further object of the invention is to provide a landing elevator for aircraft wherein the aircraft may be secured to the elevator and may be then lowered to anchored position.

An additional object of the invention is to provide an aircraft device wherein means is provided for receiving an aircraft thereon and for moving it into a housing compartment associated with the aircraft receiving means.

An additional object of the invention is to provide an aircraft landing and securing device including an underground compartment together with means for moving an aircraft into the underground compartment.

Other objects of the invention will be apparent from the following description taken in connection with the accompanying drawings, wherein:

Fig. 1 is a fragmentary detail partly in section showing the general arrangement of my aircraft landing and housing device;

Fig. 2 is a top plan view of the landing platform;

Fig. 3 is a fragmentary sectional detail partly in elevation showing parts of the operating gear;

Fig. 4 is a wiring diagram showing the means for controlling the operating gear;

Fig. 5 is an elevation partly in section showing a housing associated with the landing platform, and Fig. 6 is a view similar to Fig. 5 showing an underground storage compartment for the aircraft.

Referring to the drawing by reference characters, I have shown a landing device embodying the features of my invention. This device includes a platform which I have indicated generally at 10. This platform includes a circular track member 11 which is fixed on a plurality of masts or supporting standards 12. Each of these supporting standards, of which there are preferably three, is mounted in a tubular member 14 for movement therein. The tubular members are connected by means of pipes 15 to pipes 16 which are in communication with a fluid storage tank 17. The tank 17 is provided with a tight upper closure and in order to fill the upper portion of this tank with compressed air, I provide a compressor 18 which has a pipe 19 communicating with the tank. The compressor 18 is adapted to be driven by an electric motor 20.

The construction is such that when the motor 20 is operated the air compressor 18 will pump air into the tank 17 thus placing the fluid 21 in the tank under pressure and causing the fluid 22 in the tubular members 14 to force the supporting standards 12 upwardly thereby raising the platform 10. When it is desired to lower the platform 10 a reversible motor 25 is operated. This motor has a gear 26 thereon which drives a gear 27 which is fixed on the stem 28 of an air releasing valve 29. When the motor 25 is operated in one direction the valve 29 will be opened thereby allowing the air to escape from the tank 17 so that the pressure of the fluid 21 is lowered and the platform 10 is thus allowed to be lowered. To again raise the platform the motor 25 would be reversed to close the valve 29 after which the motor 20 would be operated to drive the air compressor 18.

The platform previously mentioned comprises a base 30 which is provided with a plurality of rollers 31 about the periphery thereof. These rollers 31 engage the upper surface of the fixed track 11 as shown in Fig. 3. The base 30 is also provided with a plurality of depending arms 32 provided with rollers 33 which engage the outside of the track 11 and with rollers 34 which engage the bottom of the track 11.

The track is provided with a curved rack 35 which is secured to the lower surface thereof and this rack is engaged by a pinion 36 fixed on a shaft 37 which is mounted on a bracket 38 secured to the under surface of the base 30. The bracket 38 supports a motor 39, the armature shaft of which is attached to the shaft 37 so that the motor 39, which is a reversible one, may be made to turn the platform in either direction.

The under side of the base is also provided with a bracket 40 which supports a reversible motor 41. This motor 41 has a shaft 42 thereon on which a worm wheel 43 is fixed. This worm wheel 43 engages a worm 44 which is secured to a sheave 45 mounted on a shaft 46. The shaft 46 is supported on a pair of brackets 47 and the sheave is adapted to have a cable 48 wound thereon. This cable 48 is arranged to be secured to the aircraft to pull it down to position on the base 30.

The aircraft is provided with a plurality of spaced clips 50 which are adapted to be engaged by pivoted locking members 51, best shown in Fig. 3. There are preferably a plurality of these fastening members 51 shown diagrammatically in Fig. 2. The fastening members 51 comprise bell crank members mounted on pivots 52. Each member is provided with a member 53 which engages a clip 50 and a projecting arm 54 which engages a cable 55. The cables 55 all pass to a control lever 56 so that the locking members 51 can all be released simultaneously. The arms 51 are provided with notched portions 57 which engage retaining members 58 shown as normally urged to operative position by means of springs 59. These members 58 are each connected by cables 60 with an operating member 61, which is disposed adjacent the operating member 56. In operating the device, after the aircraft has been positioned on the platform the lever 61 is rocked thereby rocking the members 58 and releasing the members 51 which move from the dotted line position shown in Fig. 3 to the solid line position shown in this figure, thereby engaging the clips 50 and holding the aircraft in position. When the aircraft is ready to be cast off the lever 56 is rocked, thereby rocking the fastening members and disengaging them from the clips.

The levers 56 and 61 are shown as arranged in a cabin 62 mounted on the outer edge of the base 30. This cabin is provided with port holes 63 and with a search light 64 which may be turned to play upon any desired object.

In order to hold the supporting standards 12 in position and to prevent undue swaying of these standards, I provide three or more spaced cables 70 which are mounted on cable drums 71. These cable drums are provided with worms 72 which engage worm wheels 73 fixed on the armature shafts 74 of motors 75. These motors are of the reversible type and by means of circuits to be presently described, the operator will be enabled to operate these motors 75 so that the supporting standards 12 will not be unduly strained while an aircraft is being landed or is being cast off.

In order to provide means for pulling the platform 10 downwardly I anchor a cable 76 to the lower surface of the platform. This cable is mounted on a drum 77 which is adapted to be driven from a motor 78 as shown in Fig. 1. The motor 78 is a reversible one so that the cable can be wound up or paid out as desired.

In conjunction with my landing device I provide the housing device which may be of the type shown in Fig. 5 wherein the supporting standards 12 and the platform 10 may be in all respects similar to that previously described. The aircraft is indicated generally at 80. The supporting standards 12 are arranged within a frame work or housing 81. This housing is provided with sides and ends and with inclined portions I mount closures 83 on rollers 84. These closures 83 are adapted to move to the dotted line position shown in Fig. 5 to close the top of the device.

In Fig. 6 the supporting standards 12 are shown as arranged in a well-like compartment 85 which has closure members 86 mounted on rollers 87 to move to closed position after the aircraft 80 is in the well. A tunnel 88 leads from the well 85 and after the aircraft has been moved into the well 85 it may be moved off into the tunnel to the dotted line position shown. In moving the aircraft it is preferably arranged on rollers 89 which support a receiving platform. The receiving platform 89' may be placed on the platform 10 before the aircraft is landed or it may be placed beneath the aircraft after the latter is in the well by raising the aircraft slightly, inserting the platform 89' and then pulling the aircraft down to position.

In connection with the housing device 56 I would employ cables 71 as previously mentioned. It will be understood that these cables would be covered by extensions of the housing, although it is deemed unnecessary to specifically describe the manner in which the cables are covered and protected.

In order to provide suitable connections for operating the various motors described, I may employ wiring circuits such as shown in Fig. 4. These circuits are furnished with current from a generator 90. This generator includes a lead 91 which passes through an armature ring and brushes 92 on a shaft 93 which is arranged to rotate with the cable drum 77. All of the leads from the ground level which I will now proceed to describe have rings and brushes which take them from the generator along the cable 76 to the cabin 62, previously described, in which all of the operating switches are preferably located. The lead 91 from the generator passes to a terminal 94 of a switch 95. The other terminal 96 of which is connected to a lead 97 which is connected by means of a lead 98 with one terminal of a search light 64. The other terminal of the search light is connected to a lead 99, which is in turn connected to a lead 100 shown as connected at 101 to a lead 102 which is connected to the generator 90 previously described. It will thus be apparent that when the switch 95 is closed that the search light will be illuminated.

The lead 97 is also connected to a lead 103 which is connected to one terminal of landing lights 104 which are preferably flood lights disposed in or on the base 30. The other terminals of these landing lights 104 are connected by a lead 105 with the lead 100 previously described. It will thus be apparent that when the circuit 95 is closed it will also close the circuit to the landing lights 104 so that the space above the landing platform will be brightly illuminated.

The motor 39 which is a reversible motor, has one terminal thereof connected by a lead 106 with the lead 100. The companion terminal is connected by a lead 107 with a terminal 108 of a reversing switch 109 which is connected to the lead 91. The other terminal 110 of the reversing switch is connected by a lead 111 with another terminal 112 on the motor. The companion terminal 113 is connected by a lead 114 with the lead 100 previously described. From the foregoing description it will be apparent that when the switch 109 is moved to the right in Fig. 4 it will cause the motor to operate in one direction while if the switch is moved to the left in Fig. 4 it will cause a reversing of the motor 39 so that by moving the switch 109 the operator may turn the platform in either direction.

The motor 41 which controls the cable drum 45 has one terminal connected by a lead 115 with the lead 114 which is in circuit with the lead 100. The companion terminal is connected by a lead 116 with a terminal 117 of a reversing switch 118, the control member of which is connected to the lead 91 previously described. The switch includes a terminal 119 which is connected by a lead 120 with a terminal 121 of the motor 41. The companion terminal 122 is connected by a lead 123 with the lead 100 previously described. It will thus be apparent that as the switch member 118 is moved to the right and left in Fig. 4 it will cause reversal of the motor 41 to pull in or pay out the cable 48.

In order to control the motor 25 which operates the valve 29 I connect one terminal of this motor by means of a lead 124 (which runs through the armature ring 92) with a terminal 125 of a switch, the control member of which is shown at 126 as in circuit with the lead 91. The companion terminal of the motor 25 is connected by means of a lead 127 with a lead 128 which is in circuit with the generator 90. Adjacent the terminal 125 is a terminal 129 which is connected to a lead 130 which is in circuit with a terminal 131 on the motor 25. The companion terminal 132 is connected to the lead 128 previously described. From the foregoing description it will be apparent that when the control member 129 is moved to the right or left in Fig. 4 it will cause a reversal of the motor 25.

The control members are all so constructed that when they are in intermediate position no flow of circuit will occur.

As a safety device I prefer to provide one of the supporting standards 12 with a contact 136 which is adapted to bridge two terminals 137 and 138 when the standards 12 have reached their maximum upward position. The terminal 138 is in circuit with a lead 139 which is connected to the lead 91 while the terminal 137 is connected to a lead 140 which is in circuit with one terminal of a lamp 141 and with one terminal of a bell 142. The other terminals of the lamp 141 and bell 142 are connected to a lead 142′ which is connected to the lead 100 previously described.

It will thus be apparent that when the supporting standards have reached an upward position where the contacts 137 and 138 are bridged by the circuit closure 136 that the lamp 141 and the bell 142 will be operated to warn the person operating the mechanism. The lead 140 is connected to one terminal of a solenoid 143, the other terminal of the solenoid is connected by a lead 144 with the lead 100. It will thus be apparent that when the circuit closure 136 closes the circuit through the leads 137 and 138 that the solenoid 143 will be actuated. This solenoid 143 is connected to a switch member 145 which in turn has one terminal connected to the lead 91. The other terminal of the switch 147 is connected to a lead 148. The lead 148 is connected to one terminal 150 of the motor 20 which operates the air compressor 18. The other terminal 151 of the motor 20 is connected by means of a lead 152 with the lead 128 to the generator 90.

The actuation of the solenoid 143 will open the switch 145 and will cause the air compressor 20 to cease operating thereby causing the upward movement of the supporting standards 12 to cease. If the platform 10 moves downwardly before any controls are operated the circuit will be opened across the terminals 136 and 137 and the compressor 18 will again operate to raise the platform so that even if there are leaks in the pressure system the platform will remain raised.

The motors 75 and the motor 78 are adapted to be controlled by means of a switch 160. One terminal of this switch is connected to a lead 161 while another terminal of the switch is connected to the lead 91. The lead 161 is connected to terminals 162 on the motor 75 and to a lead 163 on the motor 78. The companion leads 164 on the motor 75 are connected to the lead 128 by leads 165, while the terminal 166 on the motor 78 is connected by a lead 167 with a lead 168 which is connected to the lead 102 which is in turn in circuit with the generator 90.

It will thus be apparent that when the controlling member 160 is moved to the left in Fig. 4 it will cause the motors 75 and the motor 78 to operate in one direction which may serve to either pay out or wind up the cables 47 and 76.

In order to cause the circuit to flow in a reverse direction and to thus reverse the motors 75 and 78, the circuit closure member 160 is adapted to be placed in contact with a terminal 170 which is connected to a lead 171. This lead 171 is connected by means of a lead 172 with a terminal 173 on the motor 78 and with terminals 174 on the motor 75. The companion leads 175 on the motor 75 are connected to the lead 128 previously described, while the lead 176 on the motor 78 is connected by means of a lead 177 with the lead 102 previously mentioned. It will thus be apparent that by movement of the control member 160 to the right in Fig. 4 that the motor 75 and the motor 78 may be reversed.

From the foregoing description it will be apparent that I have provided means whereby an aircraft may be landed and secured on a vertical, movable platform and wherein means is provided for operating the platform and that I have provided a novel housing for aircraft.

Having thus described my invention, I claim:

1. In a device of the class described, a platform, means to raise and lower said platform, means to brace said platform while it is being moved, said means comprising a plurality of cables, drums on which said cables are mounted and means for operating said drums.

2. In a device of the class described, a platform, means for raising said platform, means to lower said platform, said last mentioned means including a cable and cable drum, means to operate the drum, means to brace said platform while it is being moved, said means comprising a plurality of cables, drums on which said last mentioned cables are mounted, means for operating said drums and single means for controlling all of said drums.

3. In an aircraft landing device, a landing platform, means to raise and lower said platform, means to turn said platform, means to engage an aircraft and move it to the platform, other means to engage the aircraft after it is on the platform, a cabin on the platform and controls in said cabin for controlling all of said means.

4. In an aircraft landing device, a platform, means on the platform for engaging an aircraft, means for raising said platform, flexible means for lowering said platform, and means for constantly bracing said platform while it is being moved.

5. In an aircraft landing device, a track, hydraulic plungers for raising said track, a platform mounted to rotate on said track, means to rotate said platform, a cable drum on said platform, a cable on said drum, said cable being adapted to engage an aircraft, a search light on said platform and landing lights on said platform.

6. In an aircraft landing device, a platform, means for raising said platform, said means including hydraulic plungers, means for lowering said platform, said means including flexible cables and means for bracing said platform while it is being moved, said means including cable drums for all of said cables and means for operating all of said drums.

7. In an aircraft landing device, a base, a plurality of rigid members mounted on said base and arranged to engage an aircraft at a plurality of points and single means for operating all of said members.

8. In an aircraft landing platform, a rotatable base member, means mounted on said platform for rotating said base, and means to hold an aircraft on said base, said means including clips on the aircraft and locking members on said base, said locking members being pivotally mounted on said base and means to move said locking members, said means including an operating lever and means for holding said locking members in inoperative position.

9. In a landing device for aircraft, a base member, means on said base member for engaging an aircraft, resilient means for holding said engaging means in operative position and trigger means coacting with said engaging means to hold said engaging means in inoperative position.

10. In an aircraft landing device, a landing platform, means to raise and lower said platform, means to hold an aircraft on the platform, a cabin on the platform, and controls in said cabin for controlling all of said means.

11. In an aircraft landing device, a platform, means to raise and lower said platform, means to control actuation of said raising and lowering means and means to cause said platform to raise should it move downward to a certain point without operation of the control mechanism.

In testimony whereof, I hereunto affix my signature.

CHARLES S. HALL.